United States Patent [19]

Richter, Jr. et al.

[11] E Re. 30,246

[45] Reissued Apr. 1, 1980

[54] METHODS AND APPARATUS FOR DRIVING A MEANS IN A DRILL STRING WHILE DRILLING

[75] Inventors: Albert P. Richter, Jr., Houston; William R. McEvers, Jr., Bellaire, both of Tex.

[73] Assignee: Texaco Inc., White Plains, N.Y.

[21] Appl. No.: 836,328

[22] Filed: Sep. 26, 1977

Related U.S. Patent Documents

Reissue of:

[64] Patent No.: 3,908,770
Issued: Sep. 30, 1975
Appl. No.: 469,147
Filed: May 13, 1974

U.S. Applications:

[60] Division of Ser. No. 363,784, May 24, 1973, Pat. No. 3,837,223, and a continuation-in-part of Ser. No. 290,676, Sep. 20, 1972, Pat. No. 3,820,389.

[51] Int. Cl.[2] ..... E21C 7/08; E21B 3/12

[52] U.S. Cl. ..... 175/65; 73/152; 175/93; 175/107

[58] Field of Search ..... 340/18 LD, 18 NC; 175/40, 45, 50, 60, 65, 93, 107, 104; 73/151, 152; 116/137; 324/1

[56] References Cited

U.S. PATENT DOCUMENTS

| | | | |
|---|---|---|---|
| 2,380,520 | 7/1945 | Hassler | 175/50 X |
| 2,700,131 | 1/1955 | Otis et al. | 324/1 |
| 2,717,763 | 9/1955 | Bodine, Jr. | 175/107 X |
| 2,787,759 | 4/1957 | Arps | 324/1 |
| 2,800,296 | 7/1957 | Hatch et al. | 175/107 X |
| 2,915,285 | 12/1959 | Deily | 175/107 X |
| 2,940,039 | 6/1960 | Yost et al. | 175/107 X |
| 2,958,821 | 11/1960 | Webb | 175/107 X |
| 3,302,457 | 2/1967 | Mayes | 73/152 |
| 3,309,656 | 3/1967 | Godbey | 340/18 |
| 3,737,843 | 6/1973 | Le Peuvedic et al. | 175/45 |
| 3,788,136 | 1/1974 | Park | 73/151 |
| 3,790,930 | 2/1974 | Lamel et al. | 175/40 X |
| 3,805,606 | 4/1974 | Stelzer et al. | 73/152 |

*Primary Examiner*—James A. Leppink
*Assistant Examiner*—Richard E. Favreau
*Attorney, Agent, or Firm*—Carl G. Ries; Thomas H. Whaley; Theron H. Nichols

[57] ABSTRACT

[A method and at least one mechanism for carrying out the method is disclosed. A method of (1) generating time modulated torque pulses by engaging and disengaging a mud turbine driven rotating torque generator in the bottom of a wellbore, and (2) monitoring the top of the drill string for the torque pulses therein may be practiced by a mud driven turbine inertial wheel for being momentarily and precisely braked or decelerated relative to a drill collar on the lower end of a drill string in a wellbore while drilling for generating the time modulated torque pulses in the drill string for being monitored at the surface. Mechanical, electrical, and fluid operated brakes and a mud turbine driven motor are disclosed for providing power to a motor at the bottom of the drill string or for being intermittently braked rapidly for generating the torque pulses.]

*Methods and apparatuses for driving a means, as a power generator in a drill string while drilling, in a well are disclosed. One method comprises (1) circulating drilling mud internally of the drill string, (2) rotating a turbine in the drill string with the circulating drilling mud, (3) driving the power generator in the drill string with the mud driven turbine, and (4) powering a modulated torque pulse generator control system with the power generator for generating modulated torque pulses in the drill string. A transmission system for driving a modulated pulse generator means while drilling comprises (1) mud driven turbine means including a cylindrically shaped turbine having inwardly extending vanes for receiving and having drilling mud circulating therethrough, and (2) the mud driven cylindrical turbine means being responsive to the circulating drilling mud for powering the modulated pulse generator means while drilling.*

9 Claims, 4 Drawing Figures

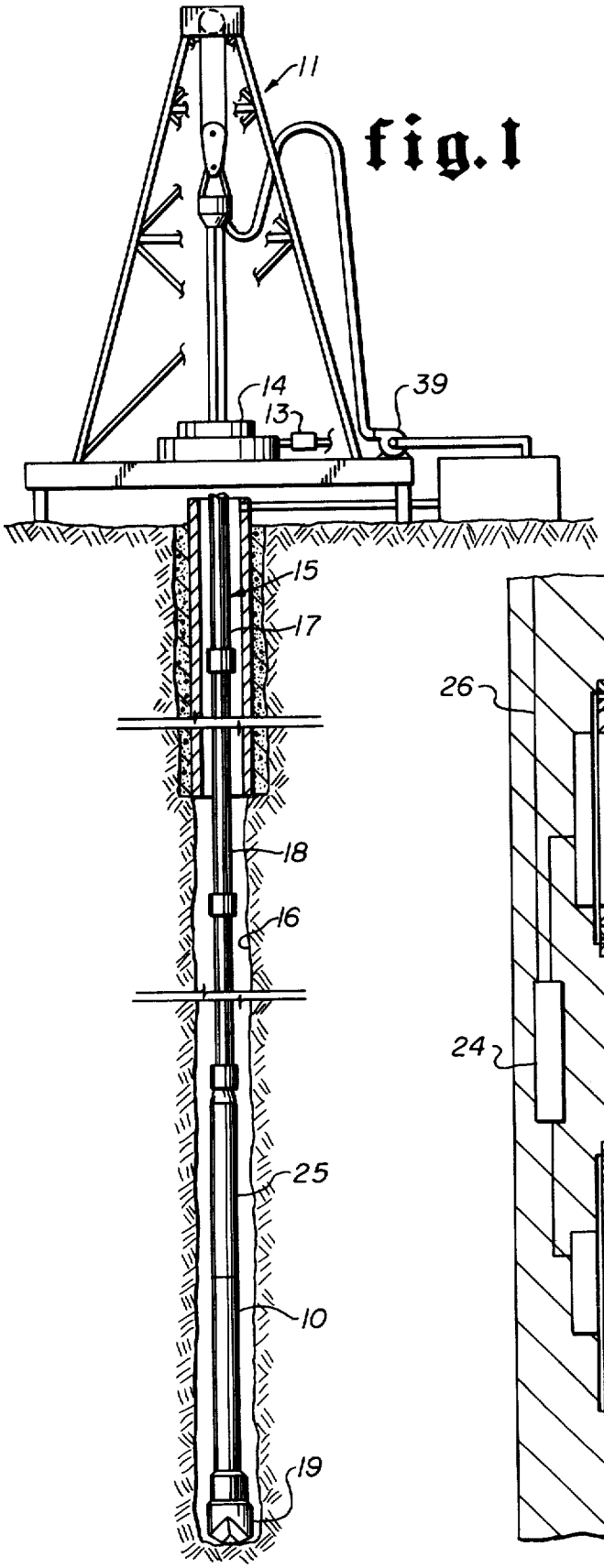
fig. 1
fig. 2
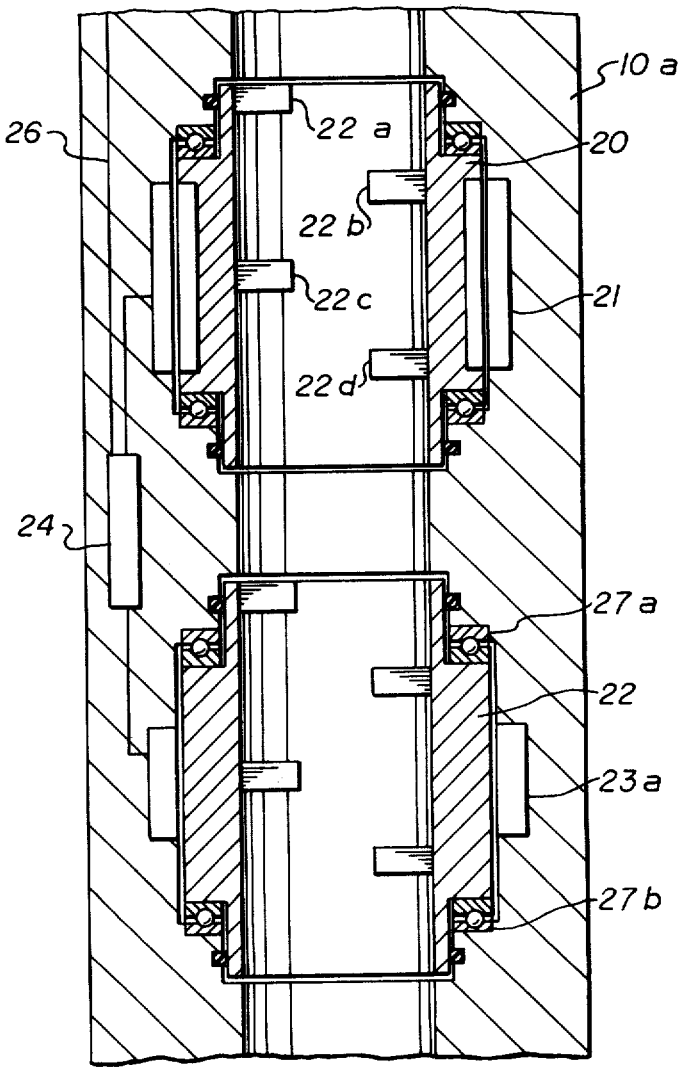

fig. 3
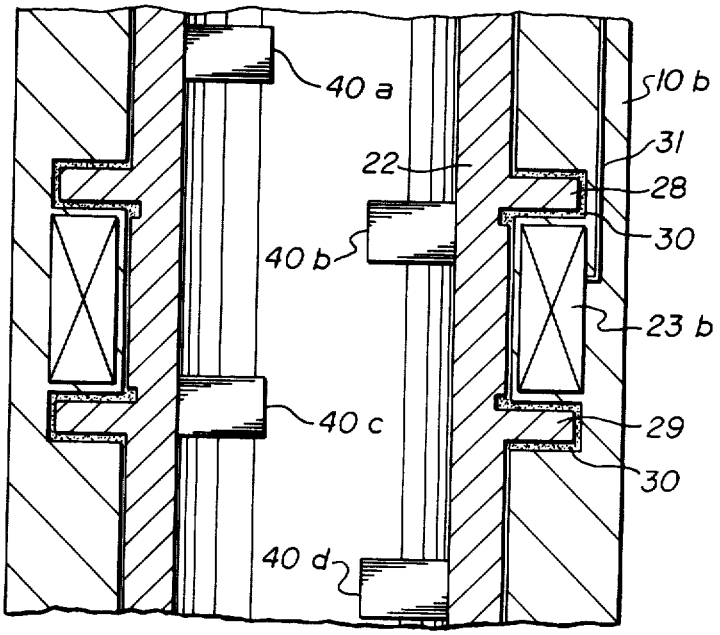
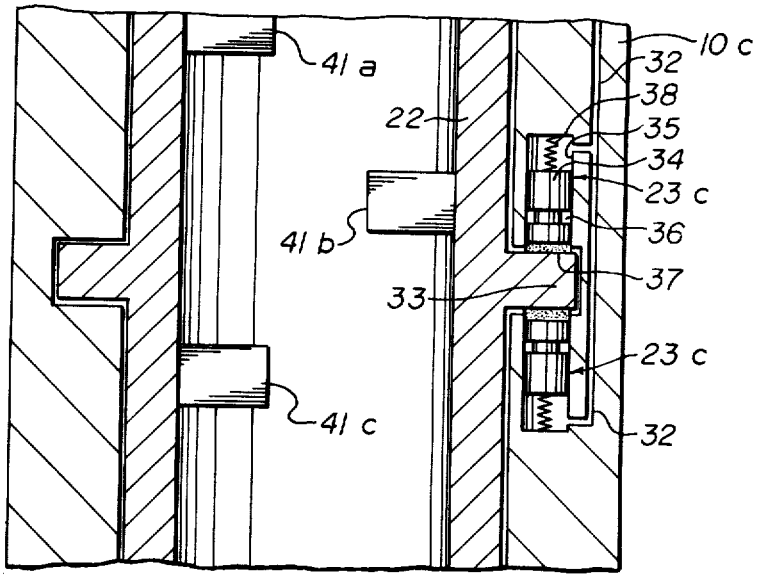
fig. 4

METHODS AND APPARATUS FOR DRIVING A MEANS IN A DRILL STRING WHILE DRILLING

Matter enclosed in heavy brackets [ ] appears in the original patent but forms no part of this reissue specification; matter printed in italics indicates the additions made by reissue.

This is a division of application Ser. No. 363,784, filed May 24, 1973, now U.S. Pat. No. [3,837,233] *3,837,223* and is a continuation-in-part of our invention entitled "Method and apparatuses for transmission of data from drill bit in well while drilling", Ser. No. 290,676, filed [Aug.] *Sept.* 20, 1972, now U.S. Pat. No. 3,820,389.

BACKGROUND OF THE INVENTION

While drilling wells such as wells for the recovery of petroleum from subsurface petroleum containing formations, there are many measurements which are desired by people doing the drilling for determining the lithology being encountered as the wellbore progresses deeper and deeper into the earth. The usual practice today during the drilling of oil and gas wells is to interrupt the drilling operation periodically, to pull the entire drill string from the wellbore, and to run logging tools down into the wellbore for determining the types of earth formations which have been penetrated by the wellbore and the characteristics of such formation layers indicative of the presence of petroleum deposits prior to running the entire drill string back into the wellbore. As the well gets deeper and deeper, the time required for the removal and rerunning of this drill string, known in the industry as a trip, becomes greater and greater. Some wells are so deep as to require 24 hours to make a trip, plus many additional hours for the running of a logging tool into the formation. Further it has long been realized that it would be highly desirable to perform certain basic logging operations during the course of the drilling operation, and to transmit such information back up to the surface either periodically or continually. If this were possible, it would permit a complete record of the subsurface lithology to be accumulated as the drilling proceeds and would not necessitate the delay of drilling operations for the running of logs.

Thus it would be very advantageous, during drilling operations of a wellbore, to possess a signal system for the transmission of information from the area of the bottom of the wellbore near the drill bit to the surface using the most convenient continuous communications line available, the drill string, as the communication medium. For many types of information, the signal does not have to be transmitted continuously during drilling, but can be transmitted at certain intervals. Exemplary information that is needed very urgently at the surface during drilling are borehole deviation, information from drilling tests stored in a memory unit or a warning signal, as a pressure difference detected and stored when drilling through a gas zone. Thus during drilling it would be desirious to obtain this information as soon as possible.

While prior signal transmission systems comprise modulation of mud pressure or mud flow by a variable valve in the mud conduit in the bottom of the drill pipe, etc., as in U.S. Pat. Nos. 2,930,137; 3,327,527; or 3,345,867; these systems are not reliable due to possible sticking of the valve because of the solids in the mud or due to failure of the valve because of the abrasion thereof by the mud per se. Another prior but different data transmissions system comprises a controllable wellbore wall engaging means extending transversely from the sides of the drill stem for momentarily increasing the drag or torque in the drill pipe while rotating the drill pipe for sending torque pulses to the surface through the drill string. This latter system, invented by Jack H. Park, is disclosed in patent application Ser. No. 279,899 filed Aug. 11, 1972, now U.S. Pat. No. 3,788,136 by Assignee of record. Others, as in U.S. Pat. No. 3,520,375, have detected the mechanical characteristics of rocks being drilled by comparing the vertical vibrations and axial movement of the drilling assembly for comparison with known rock properties and apparently any resultant torsional accelerations as the drill bits roll over and grind up the rocks.

Another similar but different torque signal transmission system is disclosed by the instant inventors in their above-identified co-pending parent patent application which utilizes pure inertial devices which are detachably connected to and brought up to speed by the rotating drill string, the drill string being stopped or slowed momentarily and braking action applied to the rotating inertial device. The inertial torque signal applied to the drill string at the bit is transmitted through the drill string to the surface and detected by a torque meter. This system requires stopping or slowing of the drill string rotary speed to produce a relative rotary speed between the inertia device and drill string. While this system is useful for transmitting some types of information, it is also desirable to have a continuous transmission system that will send signals to the surface continuously during the drilling operations with no stops or slowdowns of the rotating drill string.

Further, a new apparatus for driving a motor or generator in the lower end of the drill string comprising a mud driven turbine wheel is disclosed.

OBJECTS OF THE INVENTION

Accordingly, a primary object of this invention is to provide a reliable method for transmission of data from the bottom of a wellbore to the top while drilling.

Another primary object of this invention is to provide a data transmission system utilizing a rotating torque pulse generator that may be braked relative to the drill string for precise interruption of torque forces therein without slowing down rotation of the drill string when drilling for transmitting torque pulses for detection at the top of the drill string.

Still another object of this invention is to provide a data transmission system utilizing a mud turbine driven rotating inertial wheel that is decelerated relative to the drill string with a mechanical clutch while drilling.

Another object of this invention is to provide a data transmission system utilizing a rotating torque pulse generator that is decelerated relative to the drill string with a magnetic actuated clutch while drilling.

Yet another object of this invention is to provide a data transmission system utilizing a rotating inertial wheel that is braked relative to the drill string with a fluid operated clutch while drilling.

A further object of this invention is to provide a mud driven source of power in the lower end of the drill string for operating a motor or generator therein.

A still further object of this invention is to provide a mud driven turbine wheel torque pulse generating means in a drill string for transmitting data relative to torque pulses in the lower end of the drill string for traveling up through the drill string to a torque pulse monitor at the top of the well.

A still further object of this invention is to provide a data transmission system for continuous transmission of data from the bottom of a wellbore without slowing down of the drill string while drilling which is easy to operate, is of simple configuration, is economical to build and assemble, and is of greater efficiency for generating time modulated torque signals from the lower end of a rotating drill string deep in a well to the surface.

BRIEF DESCRIPTION OF THE DRAWINGS

The drawings diagrammatically illustrate by way of example, not by way of limitation, three forms or mechanisms for carrying out the methods of the invention wherein like reference numerals have been employed to indicate similar parts in the several views in which:

FIG. 1 is a schematic vertical view of the invention when incorporated in an oil or gas well being drilled;

FIG. 2 is a schematic vertical enlarged sectional view of the invention as mounted in a drill collar of the drill string of FIG. 1;

FIG. 3 is another modification of FIG. 2 having an electrically operated clutch illustrated schematically in section; and FIG. 4 is another modification of FIG. 2 having a fluid operated clutch illustrated schematically in section.

DESCRIPTION OF THE INVENTION

The invention disclosed herein, the scope of which being defined in the appended claims, is not limited in its application to the details of construction and arrangements of parts shown and described for carrying out the disclosed methods, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF APPARATUS FOR DRIVING MOTOR AT BOTTOM OF DRILL STRING

FIG. 1, a schematic vertical view of an oil or gas well drilling rig, at the bottom of which is a drill collar 10 for containing the apparatus for driving a motor or generator in the lower end of the drill string.

FIG. 2, an enlarged schematic vertical sectional view of a portion of the drill collar 10a with a mud turbine driven wheel 20 for driving motor-generator 21 mounted between the drill collar 10a and the turbine wheel 20. Mud turbine wheel 20 has turbine blades 22a–22d. The substantially steady flow of drilling mud down the drill string internally of the drill collar 10 during drilling *from a conventional mud pump 39, FIG. 1,* is sufficient to cause high speed rotation of motor-generator 21 for generating more than adequate electric current for driving practically any motor or system desired in the drill string.

DESCRIPTION OF THE [METHOD] *METHODS*

[A method is set forth for transmitting data from the bottom of a drill string in a wellbore during drilling thereof to the top of the wellbore comprising the steps of,]

[1. generating data by measuring preselected subsurface parameters,]

[2. generating torque pulses relative to the data by intermittently braking a mud turbine driven rotating torque pulse generator in a drill collar preferably on the lower end of the drill string at the bottom of the wellbore, and]

[3. monitoring the top of the drill string for the torque pulses therein.]

[For greater details, the second step may comprise:]

[1. interrupting the turning of a mud turbine driven rotating inertial wheel on a drill string during drilling by momentarily braking the mud turbine driven rotating inertial wheel to generate torque pulses in the drill string relative to the data.]

[The second step may be modified further as by:]

[1. braking a mud turbine driven rotating inertial wheel on the lower end of a rotating drill string, and]

[2. controlling the braking of the mud turbine driven rotating inertial wheel relative to the drill string for generating the precise torque pulses in the drill string relative to the data.]

[More details of the third step of the basic method comprise:]

[1. monitoring the time modulation between the torque pulses in the drill string.]

[The torque pulses may be either positive or negative.]

[Further details of the third basic step comprise:]

[1. monitoring the time modulation of either the length of the time between the pulses, the length of the pulse, or the number of pulses in the drill string due to intermittent braking of the mud turbine driven rotating torque pulse generator relative to the drill collar.]

*Methods are set forth for driving a means in a drill string while drilling as a pulse generator system comprises the following steps:*

*(1) rotating a cylindrically shaped turbine with inwardly extending vanes on the internal surface of the cylinder,*

*(2) circulating drilling mud internally of the cylindrical turbine,*

*(3) contacting the inwardly extending vanes of the cylindrical turbine with the circulating drilling mud as the drilling mud circulates through the cylindrical turbine for rotating the turbine, and*

*(4) driving the pulse generator system by rotation of the cylindrical turbine while drilling.*

*Another method for driving a torque pulse generator means for generating modulated torque pulses in a drill string while drilling comprises the following steps:*

*(1) circulating drilling mud through the drill string,*

*(2) rotating turbine means in the drill string with the circulating drilling mud, and*

*(3) powering the torque pulse generator means with the rotating turbine means for generating modulated torque pulses in the drill string while drilling.*

*An apparatus for driving an electrical generator in the lower end of a drill string while drilling for powering a control system in the drill string for controlling a torque pulse generator for generating modulated torque pulses in the drill string comprises:*

*(1) pump means for circulating drilling mud from the upper end of the drill string downwardly to the drill string lower end while drilling,*

*(2) mud driven turbine wheel means in the drill string lower end connected to a power generator in said drill string lower end,*

*(3) said mud driven turbine wheel means being responsive to said downwardly circulating mud in the drill string while drilling for driving said power generator,*

*(4) a modulated torque pulse generator control system mounted in the drill string, and*

*(5) said power generator being responsive to said mud driven turbine wheel means for powering said modulated torque pulse generator control system while drilling.*

DESCRIPTION OF APPARATUSES OR SYSTEMS OF DATA TRANSMISSION FROM A WELLBORE *AND APPARATUS FOR DRIVING A MEANS IN A DRILL STRING* WHILE DRILLING

The drawings disclose several embodiments of the invention for carrying out or practicing the above described method for transmitting intelligence from the bottom of a wellbore of conditions at the bottom to the surface, either while drilling is in progress or during a lull in drilling.

FIG. 1, in greater detail discloses schematically a system for carrying out the basic method of data transmission from a wellbore during drilling operations.

In a drilling rig 11, FIG. 1, a suitable motor [12] *not shown,* drives a rotary table 14 with a sensitive torque meter 13 connected there-between. A drill string 15 in wellbore 16 has a kelly 17 rotated at its upper end by the rotary table 14 and has interconnected thereto drill pipes 18, measurement and instrumentation module 25, drill collar 10, and a drill bit 19. A conventional drilling mud pump may be incorporated with motor 12 or preferably may be separate therefrom for circulating the mud through the drill string 15.

EMBODIMENT OF FIG. 2

A feature of the invention is the mud turbine driven rotatable torque pulse generators or inertial wheels, as wheel or cylinder 22 of FIG. 2, having conventional mechanical brakes, such as but not limited to brake shoe type brakes 23a, controlled by a conventional brake controller 24 for being intermittently actuated or braked while drilling for varying the torque generated in the drill collar 10a and the drill string by the braked or decelerated inertial wheel or cylinder 22 for generating torque pulses timed or proportional to the wellbore information desired to be transmitted from control system 24. Control system 24 is powered by the generator 21 and its mud driven turbine wheel or cylinder 20 having the propeller blades or vanes 22a–22d described above.

Controller 24 and measurement and instrumentation module 25 include temperature, pressure, weight on the bit, and of other logging parameters such as SP (self potential) or resistivity for operating the brake 23a off and on for generating intermittent torque pulses time modulated in proporation to the data transmitted, such as but not limited to a conventional logging pulse generator. The measurement and instrumentation module 25, FIG. 1, is connected with wire 26, FIG. 2, to the controller 24 for generating data by measuring preselected subsurface parameters. Likewise, the controller may incorporate therein any suitable downhole tape recorder system as disclosed in U.S. Pat. No. 3,566,597.

These torque variations or torque pulses generated in the lower end of the drill string by the intermittent braking or decelerating of the rotating inertial wheel 22 relative to the drill collar 10a in drill string 15 in precisely timed intervals representing well bottom data from the controller 24 are transmitted up through the drill string, through the rotary table 14 to the sensitive torque meter 13 where the data is received. This torque meter is any suitable torque meter, such as but not limited to the Texaco Torque Meter disclosed in U.S. Pat. No. 3,295,367 by Dr. H. A. Rundell.

While only one inertial wheel 22, FIG. 2, and its attendant operating parts as the conventional clutch or brake 23a, etc., all positioned in a torque pulse generating module portion of drill collar 10a, FIG. 1, are illustrated for simplicity and clarity of disclosure, several inertial wheels are preferred to be controlled by the single controller 24, FIG. 2.

Mud turbine driven rotatable torque pulse generator or rotating inertial wheel or cylinder 22, FIG. 2, is rotatably mounted in bearings 27a and 27b in drill collar 10a and protected from the drilling mud in the center of the drill collar, if so desired, by a protective sleeve (not shown). An exemplary protective sleeve is illustrated in our above-identified co-pending parent patent application. The clutch or brake mechanism 23a having conventional brake shoes similar to automobile mechanical wheel brakes is controlled by the controller 24 so that during drilling and particularly when the drilling mud is circulated down internally of the drill string, rotating the turbine wheels or cylinders, passing through the drill bit and returning in the annular space around the drill string to the surface, the clutch or brake mechanism 23a may intermittently decelerate or engage and disengage the spinning wheel 22 relative to the spinning drill collar 10a to produce a series of opposite or positive torque forces in the drill collar for detection at the surface by the torque meter. Accordingly, vanes 22a–22d are preferably angularly set to rotate the turbine driven inertial wheel 22 in a direction opposite to the direction of rotation of the drill string for maximum relative motion between the two for increased range of braking action.

Thus in the embodiment of FIG. 2, the mud turbine driven rotatable torque pulse generator or inertial wheel is usually freely turning relative to the spinning drill collar and accordingly may be decelerated at any moment to generate positive torque pulses in the drill string 15.

In the embodiment of FIG. 2 the conventional motor-generator device 21 *is* connected between the drill collar 10a and the inertial wheel 20 with a stator on one element, as on the drill collar 10a and a rotor on the other element, as the inertial wheel 20. In operation, with several inertial wheels and motor-generators, some are connected with conventional electrical connections to generate electricity for storage thereof at the controller 24 with relative movement between the inertial wheels and the drill collar.

In operation of the modification of FIG. 2, as the mud turbine driven rotatable torque pulse generating inertial wheel or cylinder 22 is freely spinning, at the proper preset time, the brake for each of the several inertial wheels, if more than one wheel is utillized, is engaged at the precise moment to transmit the coded, time modulated torque pulses to the surface torque meter for transmission of live information or information that has been stored in the controller and measurement and instrumentation module for transmission when called for.

Further, the embodiment of FIG. 2 may be operated by the controller 24 for precisely controlling the individual braking of at least two inertial wheels for generating two torque pulses with the time therebetween being relative to, or equal to a function of, the measured parameter, as temperature of the formation, for example.

MODIFICATION OF FIG. 3

FIG. 3 discloses another modification of the embodiment of FIG. 2 wherein a magnetic clutch or brake 23b is substituted for the brake 23a of FIG. 2. Inertial wheel 22, one of several inertial wheels, if so desired, is rotatably mounted in drill collar 10b similar to the embodiment of FIG. 2. Inertial wheel 22 has annular flanges 28 and 29 integral therewith and surrounded by a suitable magnetic particle fluid or powder 30 which is solidified by an electrical coil internally of brake 23b and connected by wire 31 to and controlled by a controller (not shown) similar to that of FIG. 2. Mud propeller blades or vanes 40a–40d rotate inertial wheel 22 relative to drill collar 10b.

In operation of the magnetic particle brake operated inertial wheel 22 of FIG. 3, with the magnetic particles declutched and lying loosely, the mud turbine driven inertial wheel is allowed to rotate at the desired high speed. Then at the preselected time, the clutch or brake 23b is engaged or solidified momentarily or intermittently to suddenly engage the inertial wheels in precise succession to generate the time modulated torque pulses up the drill string to the torque meter 13, FIG. 1, for transmission of data from the area of the bottom of the well to the top in an efficient manner. Likewise, this modification may be operated in various methods as suggested for the modification of FIG. 2.

MODIFICATION OF FIG. 4

FIG. 4 illustrates another modification of the rotating torque pulse generator of FIG. 2 in the form of hydraulic brakes 23c connected with hydraulic lines 32 to a suitable hydraulic source for braking the inertial wheels 22 for generating precisely timed torque pulses in the drill collar 10c, FIG. 4, of the drill string. The inertial wheel 22 illustrated has an annular flange 33 integral with the outer surface thereof for operating with the two hydraulic brakes 23c. Each brake comprises a piston 34 operable in a cylinder 35 connected to the high pressure hydraulic fluid line 32 similar to controller 24 of FIG. 2. Piston 34 has conventional sealing O-rings 36, a friction wear pad or surface 37 on the outer end of the piston for pressing against the top side of flange 33, *and a tension spring 38 connected between the inner end of the piston and the cylinder for maintaining the brakes free and unlocked when the hydraulic lines are unpressurized. The hydraulic brakes 23c for working against the lower side of the flange 33* is similar to that above and may have a shield, if so desired, for protecting the inertial wheel 22 from the mud internally of the drill string as utilized and illustrated in our above-identified copending patent. Mud driven turbine blades or vanes 41a–41c rotate inertial wheel or cylinder 22 relative to drill collar 10c.

Thus in operation of the hydraulic brakes 23c of FIG. 4, with the hydraulic pressure line depressurized, the mud turbine driven inertial wheel or cylinder 22 is allowed to rotate at the desired speed. At the preselected time, the hydraulic brakes 23c are actuated or pressurized to momentarily or intermittently suddenly engage the friction pads 37 with both sides of flange 33 of each of the inertial wheels to generate torque pulses up the drill string to the torque meter at the surface for transmission of data from the bottom of the well to the top. Likewise, this modification may be operated in the various other methods set forth in regard to the operation of the modification of FIG. 2 and FIG. 3.

In the latter torque pulse generators of FIGS. 2, 3, and 4, while it is preferred that a motor-generator like 20 of the embodiment of FIG. 2 be utilized to power the controllers and instruments in each, storage batteries may be used if so desired.

Obviously other methods may be utilized for transmission of signals with the embodiments of either FIGS. 2, 3, or 4 than those listed above, depending on the particular information desired to be transmitted.

Accordingly, it will be seen that while drilling is in progress, the disclosed methods and several data transmission systems will transmit information from the bottom of a wellbore to the surface and will operate in a manner which meets each of the objects set forth hereinbefore.

While only a few methods of the invention and several mechanisms for carrying out the methods have been disclosed, it will be evident that various other methods and modifications are possible in the arrangement and construction of the disclosed methods and data transmission systems without departing from the scope of the invention and it is accordingly desired to comprehend within the purview of this invention such modifications as may be considered to fall within the scope of the appended claims.

We claim:

1. A method for driving *an electrical* generator in the lower end of a drill string while drilling for powering a control system in the drill string *for controlling a torque pulse generator for generating modulated torque pulses in the drill string* comprising the steps of, (a) circulating drilling mud internally of the drill string upper end to the drill string lower end,

*(b) flowing the drilling mud internally of a vaned turbine wheel in the drill string,*

[b] *(c)* rotating [a] *the* vaned turbine wheel in the drill string by action of the downwardly circulating drilling mud [and] *internally of the vaned turbine wheel,*

*(d) controlling the modulated torque pulse generator with a control system,*

[(c)] *(e)* driving [a] *the electrical* generator in the drill string with the *internal* mud driven rotating vaned turbine wheel, and

[(d)] *(f)* generating electricity with said *electrical* generator for powering the *modulated torque pulse generator* control system *while drilling.*

2. A transmissi ɔn cycle for driving a *power* generator in the lower end of a drill string for powering a control system in the drill string while drilling *for controlling a torque pulse generator for generating modulated torque pulses in the drill string* comprising, (a) pump means for circulating drilling mud from the upper end of the drill string downwardly to the drill string lower end while drilling,

*(b) turbine wheel means in the drill string lower end having drilling mud circulating internally thereof,*

[(b)] *(c) said* mud driven turbine wheel means [in the drill string lower end] *being* connected to a *power* generator in said drill string lower end,

[(c)] *(d)* said mud driven turbine wheel means being responsive to said downwardly circulating mud [in the drill string] *therethrough* while drilling for driving said *power* generator,

[(d)] *(e)* a *modulated torque pulse generator* control system mounted in the drill string, and

[(e)] *(f)* said *power* generator being responsive to said mud driven turbine wheel means *with said drilling mud circulating therethrough* for powering said *modulated torque pulse generator* control system *while drilling.*

*3. A method for driving a power generator in a drill string while drilling for powering a control system in the drill string for controlling a torque pulse generator for generating modulated torque pulses in the drill string comprising the steps of,*

*(a) circulating drilling mud internally of the drill string,*

*(b) flowing the circulating drilling mud internally of a vaned turbine wheel in the drill string,*

*(c) rotating the vaned turbine wheel in the drill string with the circulating drilling mud therein,*

*(d) driving the power generator in the drill string with the internal mud driven vane turbine wheel, and*

*(e) powering a torque pulse generator control system while drilling with the power generator for generating modulated torque pulses in the drill string.*

*4. A method as recited in claim 3 wherein the method comprises the additional steps,*

*(a) rotating the turbine with inwardly extending vanes on the internal surface thereof, and*

*(b) circulating the drilling mud internally of the vaned turbine for driving the power generator for powering the torque pulse generator control system.*

*5. A transmission system for driving a torque pulse generator means for generating modulated torque pulses in a drill string while drilling comprising,*

*(a) pump means for circulating drilling mud through a mud driven turbine means in a drill string while drilling, wherein,*

*(b) said mud driven turbine means comprises a cylinder rotatably mounted in the drill string,*

*(c) inwardly extending vanes on the internal surface of said cylinder,*

*(d) torque pulse generator means in said drill string,*

*(e) said pump means being means for circulating drilling mud through said cylinder while drilling for rotating said cylinder for powering said torque pulse generator means for generating modulated torque pulses in the drill string,*

*(f) said mud driven turbine means being responsive to said circulating drilling mud while drilling for driving said torque pulse generator means for generating the modulated torque pulses in said drill string.*

*6. A method for driving a torque pulse generator means for generating modulated torque pulses in a drill string while drilling comprising the steps of,*

*(a) circulating drilling mud through the drill string,*

*(b) flowing the drilling mud internally of a vaned turbine means in the drill string,*

*(c) rotating turbine means in the drill string with the circulating drilling mud, and*

*(d) powering the torque pulse generator means with the rotating vane turbine means for generating modulated torque pulses in the drill string while drilling.*

*7. A method for driving a pulse generator system in a well while drilling comprising the steps of,*

*(a) rotating a cylindrically shaped turbine rotor with inwardly extending vanes on the internal surface of the cylinder,*

*(b) circulating drilling mud internally of the cylindrical turbine,*

*(c) contacting the inwardly extending vanes of the cylindrical turbine with the circulating drilling mud as the drilling mud circulates through the cylindrical turbine for rotating the turbine, and*

*(d) driving the pulse generator system by rotation of the cylindrical turbine while drilling.*

*8. A transmission system for driving a modulated pulse generator control system means in a drill string while drilling in a well comprising,*

*(a) mud driven turbine means including a cylindrical shaped turbine having inwardly extending vanes,*

*(b) said cylindrical shaped turbine means inwardly extending vanes having drilling mud circulating internally thereof, and*

*(c) said mud driven cylindrical turbine means with the inwardly extending vanes being responsive to said circulating drilling mud for powering said modulated pulse generator control system means while drilling.*

*9. A transmission system for driving a pulse generator means for generating modulated pulses in a drill string while drilling in a well comprising,*

*(a) pump means for circulating drilling mud through a drill string while drilling,*

*(b) mud driven turbine means for a power generator means in the drill string,*

*(c) said mud driven turbine rotor means comprising a cylindrically shaped turbine having inwardly extending vanes for receiving and having drilling mud circulating internally of said cylindrical turbine,*

*(d) said mud driven cylindrical turbine means with said inwardly extending vanes being responsive to said circulating drilling mud therethrough while drilling for driving said power generator means,*

*(e) pulse generator means in the drill string, and*

*(f) said power generator means being responsive to said mud driven cylindrical turbine means for powering said pulse generator means while drilling.*

* * * * *